United States Patent [19]

Back

[11] Patent Number: 5,009,437

[45] Date of Patent: Apr. 23, 1991

[54] MECHANICAL FACE SEAL INCLUDING TWO DIAPHRAGMS SURROUNDING A GLAND PLATE

[75] Inventor: Anthony C. Back, Slough, United Kingdom

[73] Assignee: John Crane U.K. Limited, United Kingdom

[21] Appl. No.: 514,182

[22] Filed: Apr. 25, 1990

[30] Foreign Application Priority Data

May 3, 1989 [GB] United Kingdom ............. 8910106

[51] Int. Cl.5 ................... F16J 15/36; F16J 15/54
[52] U.S. Cl. ................................ 277/88; 277/90; 277/93 R; 277/93 SD; 277/27
[58] Field of Search ............ 277/88, 89, 90, 93 R, 277/93 SD, 81 R, 27; 464/93, 99

[56] References Cited

U.S. PATENT DOCUMENTS

| | | | |
|---|---|---|---|
| 1,505,321 | 8/1924 | Dennedy | 277/88 |
| 1,598,564 | 8/1926 | Earnshaw | 277/90 |
| 2,389,528 | 11/1945 | McConaghy | 277/90 |
| 2,747,901 | 5/1956 | Clavell | 277/88 |
| 3,160,418 | 12/1964 | Barske | 277/90 |

Primary Examiner—Thomas B. Will
Assistant Examiner—J. K. Folker
Attorney, Agent, or Firm—Davis, Bujold & Streck

[57] ABSTRACT

A seal for providing a fluid tight seal between a pair of relatively rotatable components has a first seal face member mounted in fixed axial and rotational relationship and sealed with respect to one component and a second seal face member sealed with respect to said other component, the second seal face member being sealed with respect to its associated component by a radially extending diaphragm, the diaphragm being disposed on the high pressure side of the seal face members, so that when subjected to fluid under pressure the force acting on the diaphragm will urge the second seal face member into engagement with the first seal face member.

9 Claims, 1 Drawing Sheet

U.S. Patent
Apr. 23, 1991
5,009,437
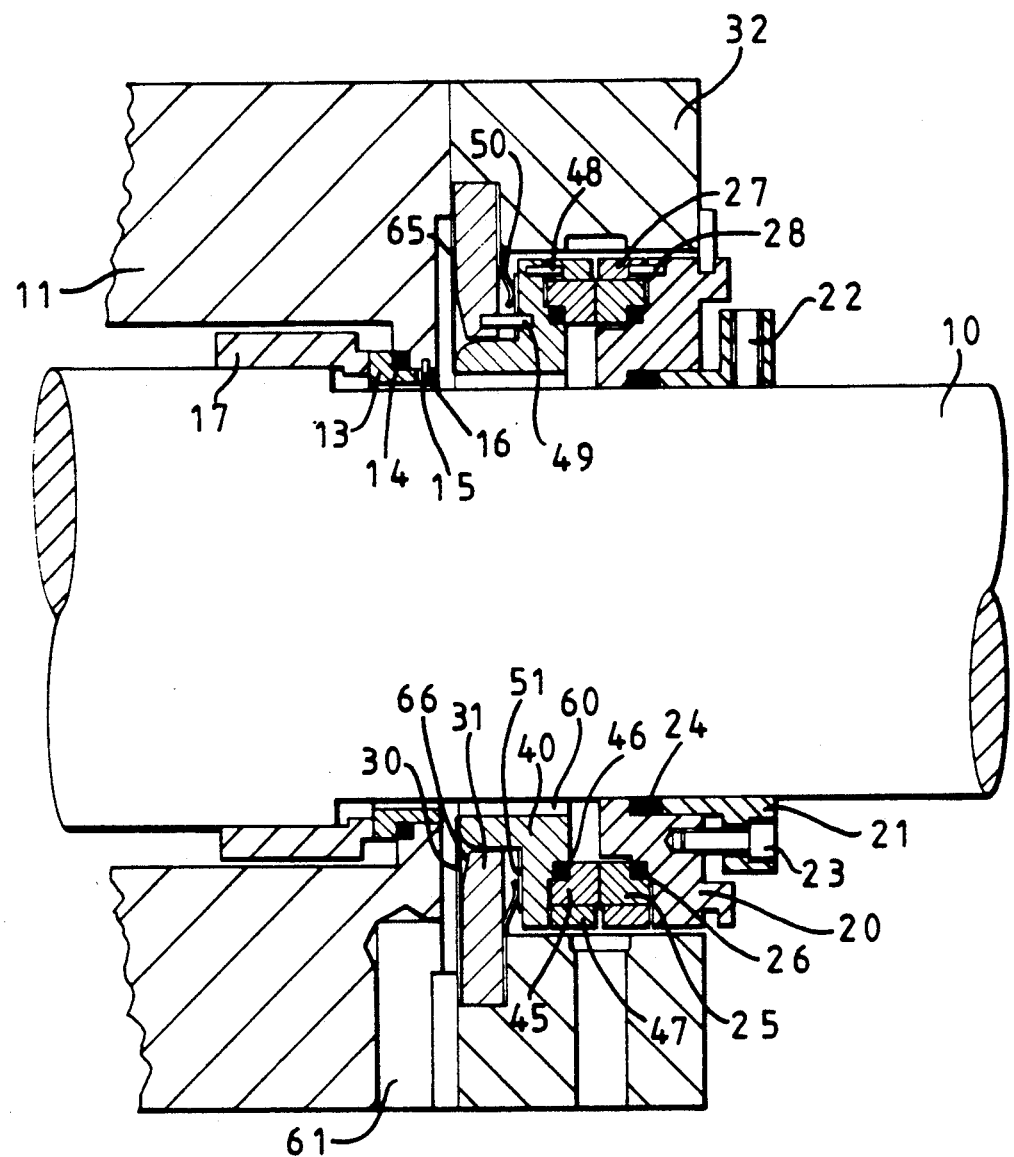

MECHANICAL FACE SEAL INCLUDING TWO DIAPHRAGMS SURROUNDING A GLAND PLATE

BACKGROUND TO THE INVENTION

The present invention relates to seals for providing a fluid tight seal between a pair of relatively rotatable components and in particular to a seal for providing secondary containment in the event of failure of primary sealing means.

SUMMARY OF THE INVENTION

According to one aspect of the present invention, a seal for providing a fluid tight seal between a pair of relatively rotatable components comprises a first seal face member mounted in fixed axial and rotational relationship and sealed with respect to one component and a second seal face member sealed with respect to said other component by means of a radially extending diaphragm, said diaphragm being disposed on the high pressure side of the seal face members so that when subjected to fluid under pressure the force acting upon the diaphragm will urge the second seal face member into engagement with the first seal face member.

Preferably the second seal face member is located in a carrier ring, a formation being provided on the associated component by means of which the carrier ring will be guided for axial movement relative to the component with which it is associated. Interengaging formations may be provided on the carrier ring and formation on the associated component to prevent relative rotation therebetween.

According to a preferred embodiment, a further resilient diaphragm acts between the second seal face member and its associated component, said further diaphragm lightly biassing the second seal face member into engagement with the first seal face member to provide a seal therebetween when fluid under pressure does not act upon the first diaphragm.

BRIEF DESCRIPTION OF THE DRAWING

An embodiment of the invention is now described, by way of example only, with reference to the accompanying drawing which shows a seal in sectional elevation.

DESCRIPTION OF A PREFERRED EMBODIMENT

The seal illustrated provides secondary containment between the shaft 10 and housing 11 and is positioned outboard of a primary mechanical face seal of conventional design.

The primary mechanical face seal comprises an annular seat 13 which is mounted on the housing 11 and is sealed with respect thereto by means of a graphite ring 14. A pin 15 mounted on the housing 11 and extending radially inwardly thereof engages in a bore 16 in the seat 13 to prevent rotation of the seat 13 relative to the housing 11.

A seal face member 17 is slidably located on the shaft 10 for rotation therewith. The seal face member 17 is sealed with respect to the shaft 10 and is urged axially into engagement with the seat 13, in known manner (not illustrated).

Outboard of the primary seal, a retaining ring 20 is secured to the shaft 10 by means of clamping ring 21. The clamping ring 21 is secured to the shaft 10 by means of a plurality of angularly spaced set screws 22, axially extending bolts 23 clamping the retaining ring 20 to the clamping ring 21 and compressing a sealing ring 24 against the shaft 10.

A seat 25 is mounted on the retaining ring 20 and sealed with respect thereto by means of sealing ring 26. A support band 27 is located around the seat 25 and is pinned to the retaining ring 20 by means of a pin 28, to prevent relative rotation therebetween.

A first annular diaphragm 30 is clamped at its outer periphery between the housing 11 and an annular gland plate 31 by means of clamping plate 32 the clamping plate 32 being bolted to the housing 11 by means of a series of angularly spaced bolts (not shown).

The diaphragm 30 extends radially inwardly of the housing 11 between the primary seal and gland plate 31. The inner periphery of the diaphragm 30 is welded to a carrier ring 40 which is located for axial movement relative to the housing 11 and shaft 10, by the inner periphery of the gland plate 31.

A seal face member 45 is mounted upon the carrier ring 40 in axially opposed relationship to the seat 25. The seal face member 45 is sealed with respect to the carrier ring 40 by means of sealing ring 46 and a support band 47 extends around the outer periphery of the seal face member 45. The support band 47 is pinned to the carrier ring 40 by means of a pin 48. The carrier ring 40 is also pinned with respect to the gland plate 31 by means of pin 49 to prevent relative rotation between the carrier ring 40 and housing 11.

A second annular diaphragm 50 is clamped at its outer periphery between the gland plate 31 and clamping plate 32. This second annular diaphragm 50 is made of resilient material and the inner periphery acts against a PTFE washer 51 on the carrier ring 40 to bias the seal face member 45 lightly into sealing engagement with the seat 25.

With the seal described above, a sealed chamber 60 is provided between the primary seal and the seal provided by engagement of the seal face member 45 with seat 25. A drain 61 is provided from this chamber to remove fluid which leaks across the primary seal during normal operation, so that there will be no build up of pressure in the chamber 60 during normal operation. The drain 61 is however restricted so that abnormal leakage past the primary seal will produce a pressure build up in the chamber 60.

Under normal operation, the seal face member 45 will be held in light engagement with the seat 25 by means of the second diaphragm 50 and will consequently be subject to only slight wear. During such operation, the first diaphragm 30 is completely unstressed thus avoiding the long term problems of fatigue and stress corrosion.

If however the primary seal fails, the diaphragm 30 will be subjected to fluid under pressure and the force acting on the diaphragm 30 will load the seal face member 45 into fluid tight sealing engagement with the seat 25. Because of the relatively large exposed area of diaphragm 30, only relatively low pressure in chamber 60 will be required to produce a large closing force between the seal face member 45 and seat 25.

The surface of the gland plate 31 adjacent diaphragm 30 is contoured, having a slight taper 65 away from diaphragm 30 at its outer periphery and an increased taper 66 away from the diaphragm 30 at its inner periphery. As the diaphragm 30 is deflected under the pressure of leaked fluid, it will first engage the taper 65. The outer peripheral portion of the diaphragm 30 will then be supported against the gland plate 31 so that at a given leakage pressure the area of diaphragm 30 will be effectively reduced. In this manner, the seal may be designed to provide an appropriate balance between the pressure of leaked fluid and the force urging the faces of the seal face member 45 and seat 25 into engagement.

With the above seal, the diaphragms 30 and 50 prevent the ingress of contaminents and thus prevent clogging between the inner periphery of the gland plate 31 and carrier ring 40, which may otherwise interfere with correct operation of the seal when required.

The diaphragm 30 may be made of an elastomeric material, a resilient plastics material or metal. The diaphragm 50 may be made from any resilient material. The seal face members 45 and seat 25 may be made from any suitable material although hard materials, for example refractory materials, which will minimise long term wear, are preferred. For high temperature applications, elastomeric materials should be avoided, the diaphragms 30 and 50 preferably being made of metal, seal face member 45 and seat 25 made of refractory materials and sealing rings 24, 26 and 46 being made of graphite.

The support bands 27 and 47 provide external support extending virtually along the entire axial length of the seal face member 45 and seat 25, subject to an allowance for wear of the sealing faces. These bands 27 and 47 will withstand toroidal distortion of the seal face member 45 and seat 25 when they are subjected to pressure and also enhance the pressure capability of the seal.

The faces of the seal face member 45 and seat 25 may be flat or may be grooved or may have a lapped angle to provide a hydrodynamic seal which will be effective in sealing either liquids or gases.

Various modifications may be made without departing from the invention. For example, while in the above embodiment the pin 49 prevents relative rotation between the gland plate 31 and carrier ring 40, the carrier ring 40 may alternatively slidably engage splines on the inner periphery of gland plate 31. Also in addition to diaphragm 50 or as an alternative, one or more spring elements may act on carrier ring 40 to lightly bias the seal face member 45 into engagement with seat 25. The support bands 27 and 47 may or may not be required depending upon the design of the seat 25 and seal face member 45 and the materials from which they are made.

I claim:

1. A seal for providing a fluid tight seal between a shaft and housing comprising a first seal face member mounted for rotation with the shaft, a second seal face member mounted on a carrier ring in axially opposed relationship to the first seal face member, a first annular radially extending diaphragm being secured at its outer periphery to a housing and at its inner periphery to the carrier ring, said first diaphragm providing a fluid tight seal between the housing and the carrier ring and being disposed on the high pressure side of the seal face members, a second resilient annular radially extending diaphragm being secured at its outer periphery to the housing, its inner periphery acting against the carrier ring to urge the second seal face member into sealing engagement with the first seal face member, said second diaphragm being disposed on the low pressure side of the first diaphragm, the first and second diaphragms being clamped to the housing with a gland plate therebetween, the gland plate extending radially inwardly in juxtaposed relationship to the first and second diaphragms, the surface of the gland plate adjacent the first diaphragm limiting deflection of the first diaphragm.

2. A seal according to claim 1 in which the second seal face member is mounted on a carrier ring, means being provided to slidably guide the carrier ring for axial movement with respect to the component.

3. A seal according to claim 2 in which interengaging formations are provided to prevent rotation of the carrier ring relative to the component with which the second seal face member is associated.

4. A seal according to claim 1 in which the first diaphragm is clamped between the housing and a gland plate, and the second diaphragm is clamped between the gland plate and a clamping plate.

5. A seal according to claim 4 in which the surface of the gland plate adjacent the first diaphragm is contoured, its outer peripheral portion having a slight taper away from the diaphragm and its inner peripheral portion having an increased taper away from the diaphragm.

6. A seal according to claim 1 in which the carrier ring slidably engages the inner periphery of the gland plate.

7. A seal according to claim 1 in which interengaging formations are provided on the gland plate and carrier ring to prevent relative rotation therebetween.

8. A seal according to claim 1 in which support bands are provided around the peripheries of the seal face members on the low pressure side thereof.

9. An assembly for providing a seal between a pair of relatively rotatable components comprising a primary sealing means and a seal as claimed in claim 1 disposed outboard of the primary sealing means, said diaphragm sealing the second seal face member to its associated component being disposed between the primary sealing means and the first and second seal face members.

* * * * *